United States Patent

Erkfritz

[15] 3,660,879
[45] May 9, 1972

[54] CUTTER WITH NESTED INDEXABLE BLADE CLAMPED BY SCREW ACTUATED WEDGE

[72] Inventor: Donald S. Erkfritz, Rockford, Ill.

[73] Assignee: The Ingersoll Milling Machine Company, Rockford, Ill.

[22] Filed: Jan. 19, 1970

[21] Appl. No.: 3,990

[52] U.S. Cl. ........................................................29/105
[51] Int. Cl. ..................................................B26d 1/12
[58] Field of Search ..........................29/96, 105, 105 A

[56] References Cited

UNITED STATES PATENTS

| 3,192,602 | 7/1965 | Copeland | 29/96 |
| 3,299,491 | 1/1967 | Hall | 29/96 |
| 3,239,911 | 3/1966 | Williams | 29/96 |
| 3,138,847 | 6/1964 | Berry, Jr. | 29/105 |
| 3,391,438 | 9/1968 | Milewski | 29/105 |

FOREIGN PATENTS OR APPLICATIONS

| 689,601 | 6/1964 | Canada | 29/105 |
| 940,895 | 11/1963 | Great Britain | 29/105 |

Primary Examiner—Harrison L. Hinson
Attorney—Wolfe, Hubbard, Leydig, Voit & Osann, Ltd.

[57] ABSTRACT

In the disclosed milling cutter, an indexable insert is seated in a nest in one end of a separately formed holder tack welded at opposite ends to edges of the body slot. A wedge, clamping the insert against a wall of the slot, is drawn into the latter by a screw threaded into the wedge and extending along the slot through a hole in a crosspiece of the holder engaged by the underside of the screw head during the tightening. Two tack welds at the inner end of the holder are located so as to be stressed in shear as a result of the screw tightening.

6 Claims, 8 Drawing Figures

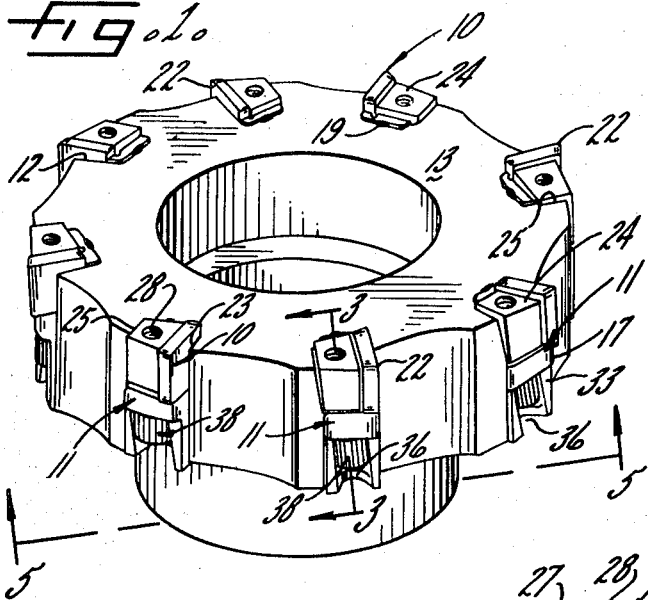
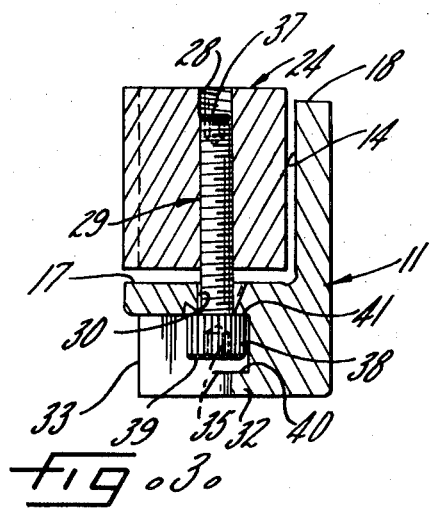
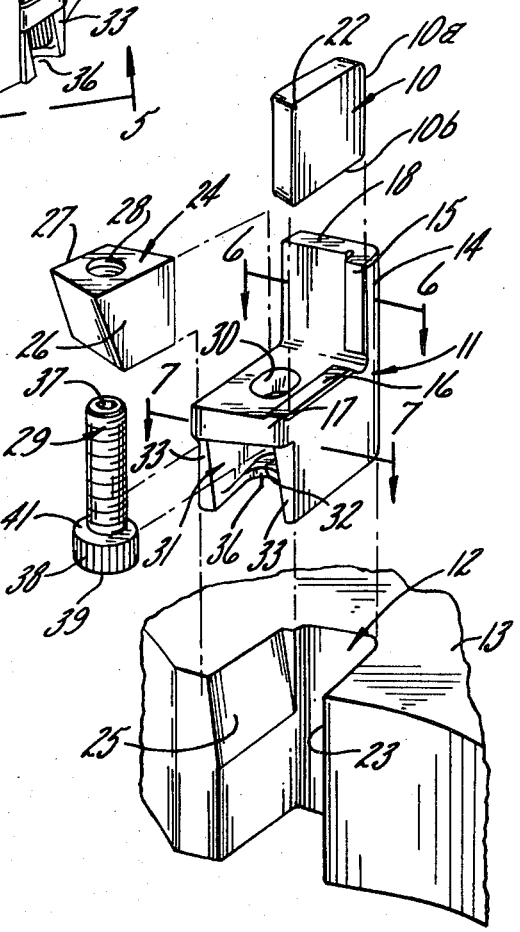
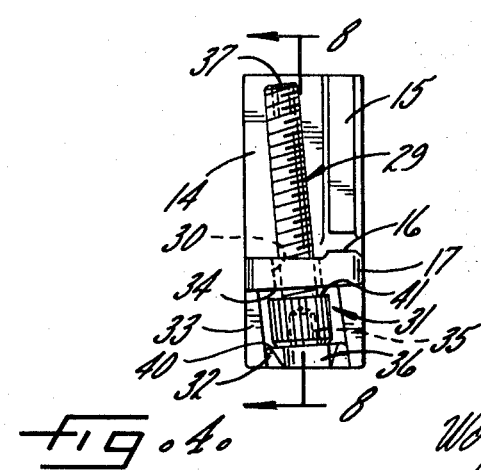

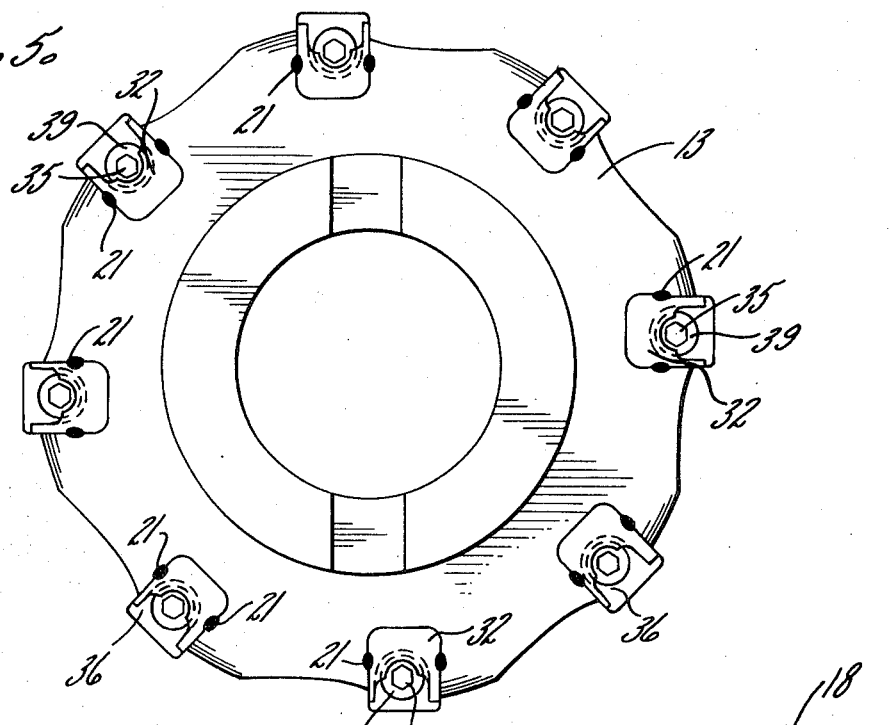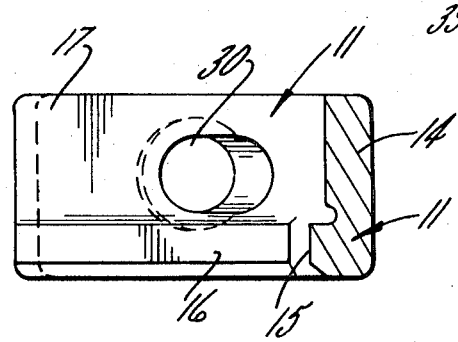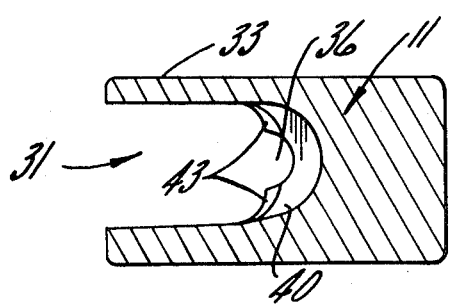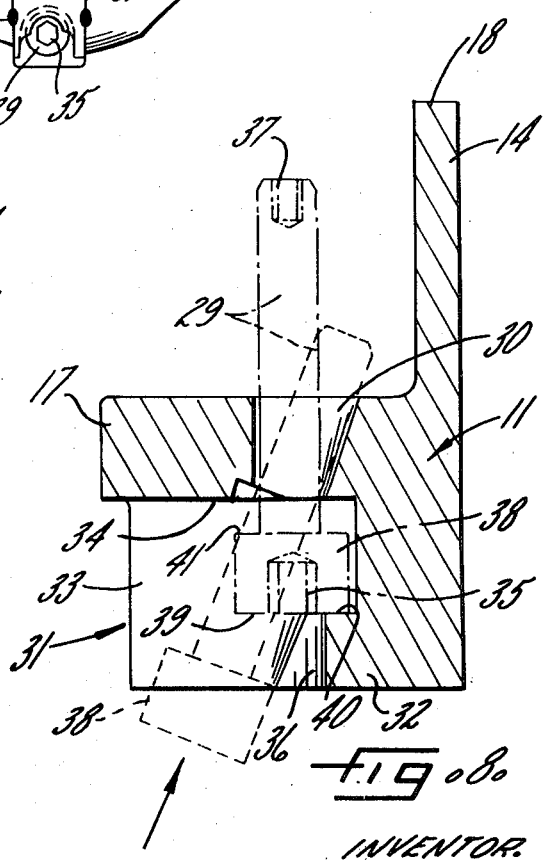

CUTTER WITH NESTED INDEXABLE BLADE CLAMPED BY SCREW ACTUATED WEDGE

BACKGROUND OF THE INVENTION

This invention relates to metal-removing cutters in which an indexable blade is seated in a holder or so-called nest anchored in a body slot by tack welding and clamped against a side of the slot by a wedge drawn into the slot by tightening of a screw which effects the clamping by extending through a crosspiece of the nest and threading into the wedge with its head abutting the crosspiece. A blade mounting of this type is disclosed in an application of James C. Ayer, Ser. No. 3,687, filed Jan. 19, 1970, and now U.S. Pat. No. 3,624,879.

SUMMARY OF THE INVENTION

The present invention improves on the nested blade mounting mentioned above by extending the screw shank through a hole in the crosspiece of the nest so as to trap and hold the screw while attached to the released wedge against sidewise movement out of the slot and falling out of the nest after loosening of the screw to release the insert for indexing. An abutment on the nest spaced from the crosspiece is engaged by the end of the screw head to force loosening of the wedge as the screw is turned reversely, this abutment being shaped to permit tilting of the loosened screw and endwise removal from the nest after turning out of and separation from the wedge.

The invention also resides in the novel location of the tack welds fastening the inner end of the nest to the cutter body.

BRIEF DESCRIPTION OF THE DRAWINGS

FIG. 1 is a perspective view of a face milling cutter embodying the novel features of the present invention.

FIG. 2 is an exploded perspective view showing a slot of the cutter body together with an indexable insert, its supporting nest, wedge, and actuating screw.

FIG. 3 is a section taken along the line 3—3 of FIG. 1.

FIG. 4 is a plan view of the blade nest.

FIG. 5 is an inner end view of the cutter taken along the plane of the line 5—5 of FIG. 1.

FIGS. 6 and 7 are sections taken respectively along the lines 6—6 and 7—7 of FIG. 2.

FIG. 8 is a section taken along the line 8—8 of FIG. 4.

DESCRIPTION OF THE PREFERRED EMBODIMENT

For purposes of illustration, the invention is shown in the drawings incorporated in a face milling cutter in which wafer-like blades or inserts 10 of cutting material are seated in and adapted for indexing relative to nests 11 and temporarily but replaceably fixed by tack welding in radially opening slots 12 formed in and spaced around the periphery of a body 13 adapted for mounting in a conventional way on a rotary spindle.

The inserts 10 may be polygonal, circular or of any other peripheral shape and adapted to present a plurality of cutting edges in active cutting position by indexing of the insert about a central axis after loosening in its mounting and reclamping in its supporting nest. In the form shown, each insert is square and formed with parallel side faces and edges disposed perpendicular thereto and mounted in the body for operation of the active cutting tips or corners 22 at negative rake angles. Each insert is seated in the nest with the inner edge $10^a$ resting on a surface 15 at the outer end of an elongated bar 14 forming the bottom of the nest and an adjacent edge $10^b$ engaging a radially disposed and outwardly facing abutment 16 on a crosspiece 17 upstanding from the bar intermediate the ends thereof. With the outer end 18 of the bar securely fastened to the body by a tack weld 19 (FIG. 1) and the inner end 20 similarly fixed by two tack welds 21 (FIG. 5) at opposite sides of the inner end of the bar, it will be apparent that, when the edges $10^a$ and $10^b$ are seated in the nest, the diagonally opposite corner 22 will be positioned for cutting engagement with a workpiece and removal of a chip therefrom during rotation of and feeding of the cutter sidewise along the workpiece for conventional face milling or axially for conventional boring.

In the form disclosed, each insert 10 is held securely against the leading wall 23 of its slot by a wedge 24 which is disposed between the back of the insert and the trailing wall 25 of the slot and is formed with opposite side walls 26 and 27 which converge inwardly along the slot from the outer end of the cutter body so as to be pressed against the insert and the wall 25 as the wedge is drawn inwardly after seating of the insert in one of its available positions in the nest.

The wedge is formed with a threaded hole 28 extending along the body slot for receiving the shank of a screw 29 projecting through a hole 30 in the crosspiece 17 and having a cylindrical head 38 which is disposed in an outwardly opening recess 31 upstanding from the inner end of the bar and defined by the flat and opposed inner faces of the crosspiece 17 and a crosspiece 32 spaced therefrom along the nest and connected thereto by side webs 33. To facilitate separation of the screw from the nest as described later, the screw head is somewhat shorter than the length of the recess 31.

With the screw thus positioned, its shank partially threaded into the wedge and an insert seated in the nest between the wedge and the slot wall 23, the underside 41 of the head 38 will, as the screw is turned in the tightening direction, come against the surface 34 of the crosspiece 17. As the tightening continues, the wedge will be drawn inwardly thus clamping the insert. Such turning of the screw is effected by a suitable tool (not shown) inserted in a non-circular recess 35 (FIGS. 3, 5 and 8) in the inner end of the screw head 38 and accessible, in this instance, through an outwardly opening notch 36 in the inner crosspiece 32 of the nest. Alternately, the screw may be turned by a tool inserted in the non-circular recess 37 (FIGS. 1, 2 and 3) in the outer end of the screw shank exposed by extending the threaded hole 28 through the full length of the wedge 24. This end of the screw is engaged by the tool when it is only desired to index the insert to present a fresh tip 22 in cutting position without removing the cutter from its supporting spindle. For this purpose, the screw is turned reversely by the tool to first bring the end 39 of the screw head against the inner surface 40 of the inner crosspiece 32. As such turning is continued, the wedge is forced outwardly along the body slot thus loosening the insert to permit of indexing to present a new tip 22 in cutting position. Then, to reclamp the insert, the screw is turned to again thread the shank into the wedge and draw the latter inwardly after the underside 41 of the screw head comes against the nest abutment 34.

In accordance with the present invention, the hole 30 in the crosspiece 17 through which the screw shank projects into the wedge hole is somewhat larger in diameter than the screw shank and shaped to trap the screw and prevent the same and the wedge attached thereto from dropping out of the nest when the screw has been backed off enough to release the insert for indexing. This is accomplished herein by forming the hole with a continuous periphery so that the loosened screw with the loose wedge attached cannot move sidewise and outwardly from the nest.

Provision is made for freeing the screw from the nest after it has been retracted out of the wedge hole. This is accomplished by tilting the freed screw from its normal position in alinement with the wedge hole as shown in dot-dash outline in FIG. 8 until the end 39 of the screw head passes out of engagement with the abutment 40 so as to permit the screw head to be retracted endwise past the edges 43 of the abutment notch 36 as shown in dotted outline in FIG. 8.

After loosening of the screw, the welds may be broken and a damaged nest removed from the body. A new nest may then be substituted and rewelded to the body and thus readied for reassembly of the wedge and insert reversing the motions illustrated in FIG. 8.

In another of its aspects, the invention contemplates locating the tack welds 21 at the inner end of the nest so that the metal thereof will be stressed in shear rather than in tension as the screw is fully tightened after the initial clamping of the new insert by the tightened wedge. Because the screw is disposed above the bottom of the nest, the force exerted on the abutment 34 of the nest, in the final tightening, tends to tip the inner end of the nest outwardly and away from the bottom of the slot. By locating the welds 21 on opposite sides of the nest and in a plane including the screw shank, the forces tending to cause such raising of the inner end of the nest out of the slot are preferably exerted in shear instead of tension on the metal of the welds. This prevents distortion of the nest, that is, the angular relation of its surfaces 18, 19 in the final tightening of the screw to clamp the insert.

It will be apparent from the foregoing that by extending the screw through the hole 30 in the crosspiece 17, the screw and the wedge, after release of the insert for indexing, are held fastened together and in the nest thus preventing the same from dropping out of the cutter body during the indexing of the inserts. At the same time, the wedge and screw may be separated by tilting followed by endwise retraction of the screw as illustrated in FIG. 8 and used with a substituted wedge. Much time is thus saved in the indexing of the inserts to present new cutting edges in face or contour milling or in cylinder boring.

I claim:

1. For use in a cutter of the character described, a holder for an indexable insert comprising a seat at one end for receiving an edge portion of said insert to locate an opposite edge portion in cutting position, an upstanding lug at the other end of the holder having an outwardly opening recess for receiving the head of a wedge actuating screw, one wall of said recess being defined by a crosspiece having a hole therethrough for receiving the shank of said screw, said hole having edges defined entirely by said crosspiece and being sized and shaped to trap said shank against sidewise removal out of said holder in all directions, and a second crosspiece adapted for engagement with the free end of the said head upon endwise retraction of the screw outwardly of said hole.

2. A cutter insert holder as defined in claim 1 in which said second crosspiece is low enough to permit the screw to be removed by tilting thereof relative to said hole to allow said head to pass by said second crosspiece as the tilted screw is retracted endwise.

3. In a material removing cutter, the combination of, a body having an elongated slot, a cutting blade in the form of a flat wafer thinner than the width of said slot and disposed in one end of said slot with one side face lying against a side wall of the slot, a wedge disposed between said blade and the other slot wall and tapering inwardly along the slot, said wedge having an inwardly opening threaded hole extending along the slot, an elongated holder for said blade comprising a bar in said slot fixed to said body and providing at one end a seat for receiving one edge portion of said blade and locating the latter edgewise, a lug upstanding from the other end of said bar and providing spaced intermediate and end crosspieces receiving between them the head of a screw whose threaded shank extends through an opening in said intermediate crosspiece and threads into said hole to draw the wedge inwardly and clamp said blade as the screw is tightened, said screw shank being trapped in said opening to prevent sidewise removal of the screw with the loosened wedge threaded thereon.

4. A cutter as defined in claim 3 in which said end crosspiece engages the end of said screw head as the screw is reversely turned to loosen said wedge, said opening being larger than the diameter of said screw shank to permit outward tilting of the head end of the screw after separation from said wedge, and said end crosspiece being low enough to allow the endwise retraction of the separated and tilted screw out of the holder.

5. A cutter as defined in claim 3 in which said holder is fixed to said body by tack welds at opposite ends of the holder, there being two such welds at the inner end of the holder disposed on opposite sides thereof and spaced above the bottom of the holder so as to be stressed in shear by the final tightening of the screw to clamp said blade.

6. A cutter as defined in claim 5 in which said two tack welds and said screw shank are disposed substantially in a common plane.

* * * * *